Sept. 11, 1923.
D. W. BOVEE
PIPE CONNECTION
Filed July 26, 1921
1,467,833
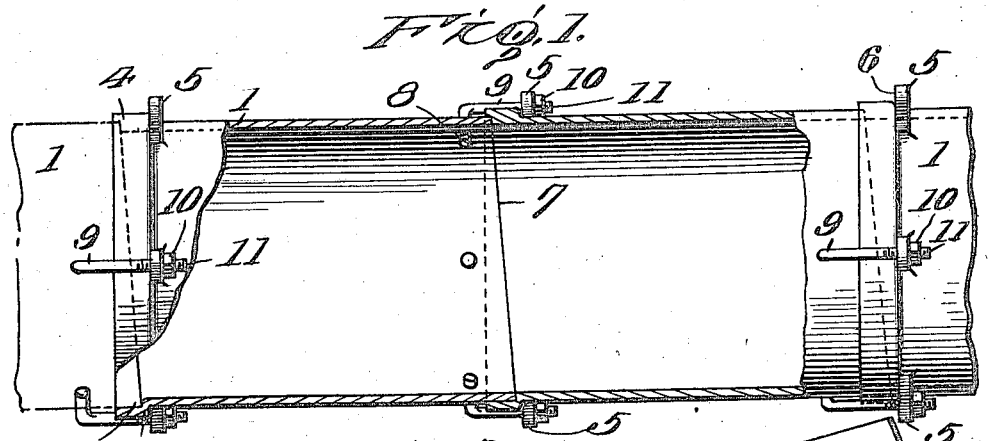
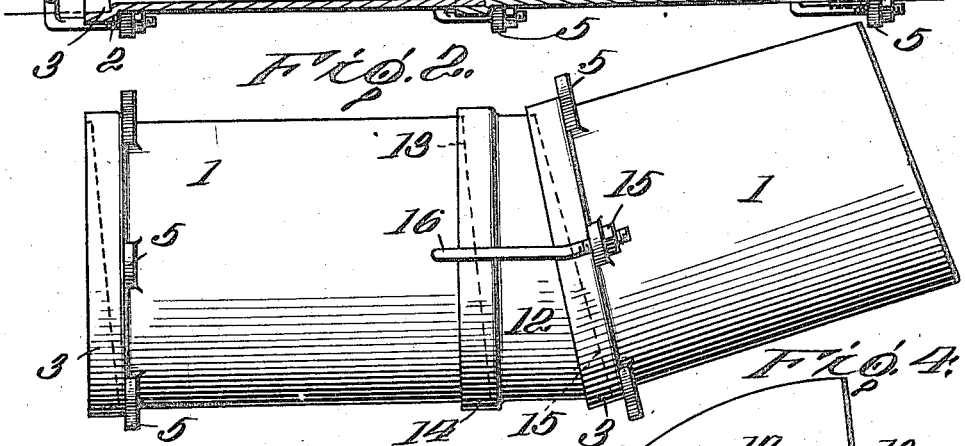
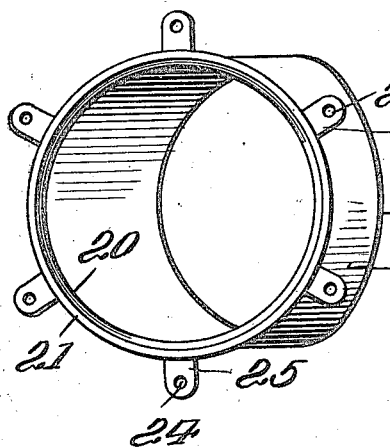
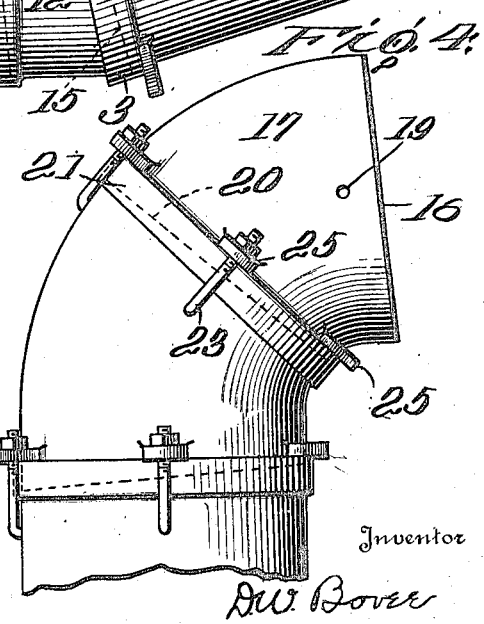
Inventor
D. W. Bovee
By A. S. Pattison
Attorney Patented Sept. 11, 1923.

1,467,833

UNITED STATES PATENT OFFICE.

DAVID W. BOVEE, OF WATERLOO, IOWA.

PIPE CONNECTION.

Application filed July 26, 1921. Serial No. 487,641.

*To all whom it may concern:*

Be it known that I, DAVID W. BOVEE, a citizen of the United States, residing at Waterloo, in the county of Black Hawk and State of Iowa, have invented certain new and useful Improvements in Pipe Connections, of which the following is a specification, reference being had therein to the accompanying drawing.

My invention relates to improvements in pipe connections, and more particularly to connections for stove, furnace or range flue pipes or the like.

The object of my invention is to provide a pipe having a novel connection construction, whereby the direction of the pipe extension is easily and readily changed and controlled.

A further object of my invention is to provide a novel construction of pipe, whereby the use of elbow joints to control the direction of the pipe extension is reduced to a minimum.

A still further object of my invention is to provide a construction of the character described, which is simple and cheap of manufacture and efficient in operation.

Other and further objects and improved results of my invention will appear in the following description and accompanying drawings.

In the drawings:

Figure 1 is a side elevation of a pipe made in accordance with my improved invention, the pipe being broken away and shown partially in longitudinal vertical section.

Fig. 2 is a side elevation of a pipe made in accordance with my improved invention.

Fig. 3 is a top plan view of a pipe elbow.

Fig. 4 is a side elevation of a pipe elbow construction made in accordance with my improved invention.

To those skilled in the art, it is well-known that a change in direction in the run of pipe is required more or less in every job of piping, as the opening in the chimney is rarely, if ever, on a line or level with the smoke collar. The number of elbows or changes in direction of the pipe run depends, of course, upon the particular job of piping and is probably different in every job. As previosuly stated, my invention is constructed and designed to overcome, to a great degree, the number of elbows required to be used in a job of piping.

Referring now to the drawings in which like reference numerals designate similar parts throughout the invention, 1 designates a hollow cylindrical pipe section, having formed at one end the circumferential integral flange 2, which is beveled from its lowest position at the bottom of the surrounding collar 3 to a point 4, adjacent the top edge of the said collar. Positioned at a plurality of points around the pipe and above the said collar 3, are the lugs 5, having in their ends the openings 6.

The opposite end of the pipe-section 1 is beveled, as at 7, and is provided with the two openings 8, the purpose of which will be hereinafter described.

The construction just described is that used for the straight pipe sections, and each straight section is constructed identically with the other.

As clearly shown in Fig. 1 of the drawings, that end of the pipe section carrying the collar is fitted over the adjacent pipe section which has no collar. As will be seen, this connection can be made so that the two lower points of the meeting beveled ends of the pipe section rest one upon the other, and when they are so joined, it will be apparent that the pipe will continue in a straight line.

To fasten the pipe sections together, I have provided the bolts 9, one end of which extends through the opening 8 of one pipe section, and whose opposite ends extend upwardly through the openings 6 in the lugs of the adjacent pipe section and are drawn tight by means of the nuts 10, being screwed down on the threads 11 of the bolt.

With the construction described, it is possible to change the direction of the pipe run to a degree by merely loosening the bolts 9, revolving the sections until the two high points and two low points of the beveled ends of the pipe sections rest one upon the other, and then refastening the sections through the medium of the bolts.

When it is desired to make a greater change in the direction of the pipe run than is afforded by the construction of Fig. 1, heretofore described, I use the construction shown in Fig. 2 of the drawings.

In this construction, as in Fig. 1, I have the straight pipe section 1 provided with similar end constructions as described heretofore, but between two of the straight pipe sections, I insert a supplemental beveled section 12.

The supplemental beveled section 12, has one end beveled as at 13, and provided with a surrounding collar 14, while its opposite end is beveled as at 15 and rests within the collar 3 of the next adjoining straight pipe section. When the supplemental pipe section is used, the bolts 16 are used and they have their one end fastened in the openings 8 of one straight pipe section, and the opposite end bolted in the lugs of the next succeeding straight pipe section, thus completely spanning the supplemental pipe section which lies between the straight pipe sections.

In this construction it will be seen that a greater adjustment in the change of the direction of the pipe run is provided, and that by loosening the nut 15 on the bolt 16, that the supplemental pipe section can be revolved without dismantling the pipe and the direction of the pipe run adjusted as desired.

Where it is found necessary to use elbows with the pipe construction of my invention, as is sometimes the case, because of the very decided change required in the direction of the pipe run, I use elbows constructed as shown in Figs. 3 and 4 of the drawings.

The elbows consist of the hollow pipe 17 having the beveled edges 18 and the bolt openings 19, while their opposite ends have the beveled edges surrounded with the collars 21, above which are carried the lugs 25.

Due to the beveled construction of the end of the elbows, a greater amount of adjustment in the change of the direction of the pipe run is effected than is the case where ordinary pipe elbows are used. As has heretofore been described in the other constructions, the pipe elbows are fastened together by means of the bolts 23 entering the openings 19 in the pipe elbows, and having their upper ends fastened in the openings 24 of the lugs 25 of the adjacent elbow.

Although the assembly shown in Fig. 4 illustrates the use of two elbows in succession, it will readily be understood that where it is desired, one elbow alone can be used between two straight pipe sections.

It will also be understood, as is clearly indicated in Fig. 4 of the drawings, that the straight pipe sections are joined on to the beveled ends of the elbows and the pipe run continued on to the desired point.

What I claim is:—

1. A pipe connection or the like, comprising two pipe sections having the plane of their engaging ends oblique to the axis, one end surface of each pipe section surrounded by a collar at right angles to the pipe, and means for fastening the sections together, for the purpose described.

2. A pipe connection or the like, comprising two pipe sections, each section having its end surface oblique to its axis, one end surface of each pipe section surrounded by a collar at right angles to the pipe, and the ends of the pipe section in engagement, whereby the end of one pipe section having the surrounding collar receives the end of the adjacent pipe section having no collar, for the purpose described.

3. A pipe section or the like, comprising a pipe having its end surfaces oblique to the pipe axis, one end surface surrounded by a collar at right angles to the pipe, and lugs carried by the surrounding collar, whereby the collared end of the pipe section is adapted to receive the uncollared end of an adjacent pipe section for the purpose described.

4. The combination with two pipe connections having end surfaces oblique to the pipe connections, one end surface of each pipe section surrounded by a collar at right angles to the pipe, of a supplemental pipe section having its end surfaces oblique to its axis carried between the pipe sections, and one end of the supplemental pipe section provided with a collar at right angles to the section, whereby the direction of the run of the pipe is changed by rotation of the supplemental pipe section.

5. A pipe section or the like, comprising a pipe having its end surfaces oblique to the pipe axis, one end surface surrounded by a collar at right angles to the pipe, whereby the collared end of the pipe section is adapted to receive the uncollared end of an adjacent pipe section, for the purpose described.

In testimony whereof I hereunto affix my signature.

DAVID W. BOVEE.